United States Patent
Dellock et al.

(10) Patent No.: US 9,517,723 B1
(45) Date of Patent: Dec. 13, 2016

(54) ILLUMINATED TIE-DOWN CLEAT

(71) Applicant: Ford Global Technologies, LLC, Dearborn, MI (US)

(72) Inventors: Paul Kenneth Dellock, Northville, MI (US); Stuart C. Salter, White Lake, MI (US); Michael Henry Maj, Livonia, MI (US); Michael Musleh, Canton, MI (US); Talat Karmo, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/002,703

(22) Filed: Jan. 21, 2016

(51) Int. Cl.
  *B60Q 1/00* (2006.01)
  *B60Q 3/00* (2006.01)
  *B60Q 3/06* (2006.01)
  *B60Q 1/24* (2006.01)

(52) U.S. Cl.
  CPC .. *B60Q 3/06* (2013.01); *B60Q 1/24* (2013.01)

(58) Field of Classification Search
  CPC ........... B60Q 1/24; B60Q 1/26; B60Q 1/2661; B60Q 3/06; B60Q 3/065
  USPC ................................ 362/485, 496, 509–510
  See application file for complete search history.

(56) References Cited

U.S. PATENT DOCUMENTS

| | | |
|---|---|---|
| 5,053,930 A | 10/1991 | Benavides |
| 5,709,453 A | 1/1998 | Krent et al. |
| 6,117,362 A | 9/2000 | Yen et al. |
| 6,375,864 B1 | 4/2002 | Phillips et al. |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,935,820 B2 | 8/2005 | Elwell et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,249,920 B2 | 7/2007 | Early et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

A vehicle is provided that includes a pickup box defining a storage area therein with at least one cleat assembly extending into the storage area. The cleat assembly includes a base, a tie-down cleat coupled to the base, and a lock assembly. The lock assembly is configured to removably couple the tie-down cleat to the base. The lock assembly includes a translucent polymer and a first phosphor material and a key configured to operate the lock assembly. The key includes a polymeric material mixed with a second phosphor material.

20 Claims, 3 Drawing Sheets

(56) References Cited

U.S. PATENT DOCUMENTS

| | | | |
|---|---|---|---|
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,071,988 B2 | 12/2011 | Lee et al. | |
| 8,097,843 B2 | 1/2012 | Agrawal et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,773,012 B2 | 7/2014 | Ryu et al. | |
| 8,846,184 B2 | 9/2014 | Agrawal et al. | |
| 8,952,341 B2 | 2/2015 | Kingsley et al. | |
| 9,057,021 B2 | 6/2015 | Kingsley et al. | |
| 9,065,447 B2 | 6/2015 | Buttolo et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2007/0032319 A1 | 2/2007 | Tufte | |
| 2007/0285938 A1 | 12/2007 | Palmer et al. | |
| 2009/0109696 A1 | 4/2009 | Lembrick et al. | |
| 2009/0219730 A1 | 9/2009 | Syfert et al. | |
| 2009/0251920 A1 | 10/2009 | Kino et al. | |
| 2009/0262515 A1 | 10/2009 | Lee et al. | |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0335994 A1 | 12/2013 | Mulder et al. | |
| 2014/0065442 A1 | 3/2014 | Kingsley et al. | |
| 2014/0103258 A1 | 4/2014 | Agrawal et al. | |
| 2014/0160776 A1 | 6/2014 | Sura et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |

FOREIGN PATENT DOCUMENTS

| | | |
|---|---|---|
| CN | 201193011 Y | 2/2009 |
| CN | 201800629 U | 4/2011 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

ILLUMINATED TIE-DOWN CLEAT

FIELD OF THE INVENTION

The present invention generally relates to vehicle lighting systems and more particularly relates to vehicle lighting systems employing phosphorescent structures.

BACKGROUND OF THE INVENTION

Illumination arising from the use of phosphorescent structures offers a unique and attractive viewing experience. It is therefore desired to implement such structures in automotive vehicles for various lighting applications.

SUMMARY OF THE INVENTION

According to one aspect of the present invention, a vehicle is provided that includes a pickup box defining a storage area therein with at least one cleat assembly extending into the storage area. The cleat assembly includes a base, a tie-down cleat coupled to the base, and a lock assembly. The lock assembly is configured to removably couple the tie-down cleat to the base. The lock assembly includes a translucent polymer and a first phosphor material and a key configured to operate the lock assembly. The key includes a polymeric material mixed with a second phosphor material.

According to another aspect of the present invention, a vehicle is provided that includes a pickup box defining a storage area therein. At least one cleat assembly extends into the storage area. The cleat assembly includes a base, a tie-down cleat coupled to the base, and a lock assembly. The lock assembly is configured to removably couple the tie-down cleat to the base and a key is configured to operate the lock assembly. The key and the lock assembly are both configured to illuminate.

According to yet another aspect of the present invention, a cleat assembly is provided that includes a tie-down cleat and a lock assembly. The lock assembly is configured to removably couple the tie-down cleat to the vehicle. The lock assembly is configured to emit light.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items. For example, if a composition is described as containing components A, B, and/or C, the composition can contain A alone; B alone; C alone; A and B in combination; A and C in combination; B and C in combination; or A, B, and C in combination.

Figure 1:
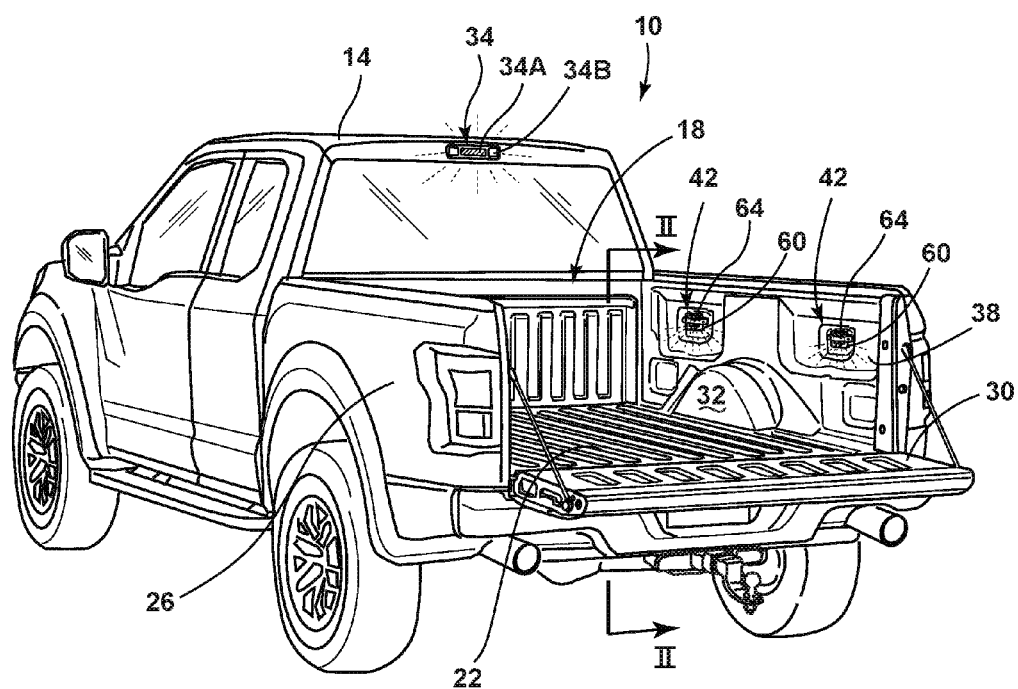
FIG. 1 illustrates a rear perspective view of a vehicle having a truck pickup box arranged in an open position, according to one embodiment.

Referring to FIG. 1, a vehicle 10 in the form of a pickup truck is generally shown having a cab 14 and a pickup box 18, according to one embodiment. The pickup box 18 is generally positioned behind the cab 14 and includes a bed 22 around which upstanding box walls 26 are disposed. Positioned at a rear end of the pickup box 18 is a tailgate 30 which is operable between an open position (FIG. 1) and a closed position. The box walls 26 and tailgate 30 define a storage space 32 within the pickup box 18 configured to haul and/or stow a variety of cargo items. Positioned on an upper portion of the cab 14 is a light assembly 34 including a center high mount stop light 34A (CHMSL) configured to be activated and emit light under a variety of circumstances (e.g., braking of the vehicle 10, running light, hazard notification) and at least one bed light 34B configured to illuminate the pick-up box 18. The CHMSL 34A and/or bed lights 34B may emit light illumination toward a rear of the vehicle 10, into the pickup box 18 and/or to the sides of the vehicle 10 when activated. The CHMSL 34A may be colored (e.g., red) and the bed lights 34B may be clear. Positioned on an inner surface 38 of the box walls 26 are multiple cleat assemblies 42 which are secured to the box walls 26 and extend into the pickup box 18. The pickup box 18 may include one or more cleat assemblies 42 configured to aid in the securement of objects within the storage area 32 pickup box 18 (e.g., via providing securement locations or features for ropes, straps or the like).

Figure 2A:
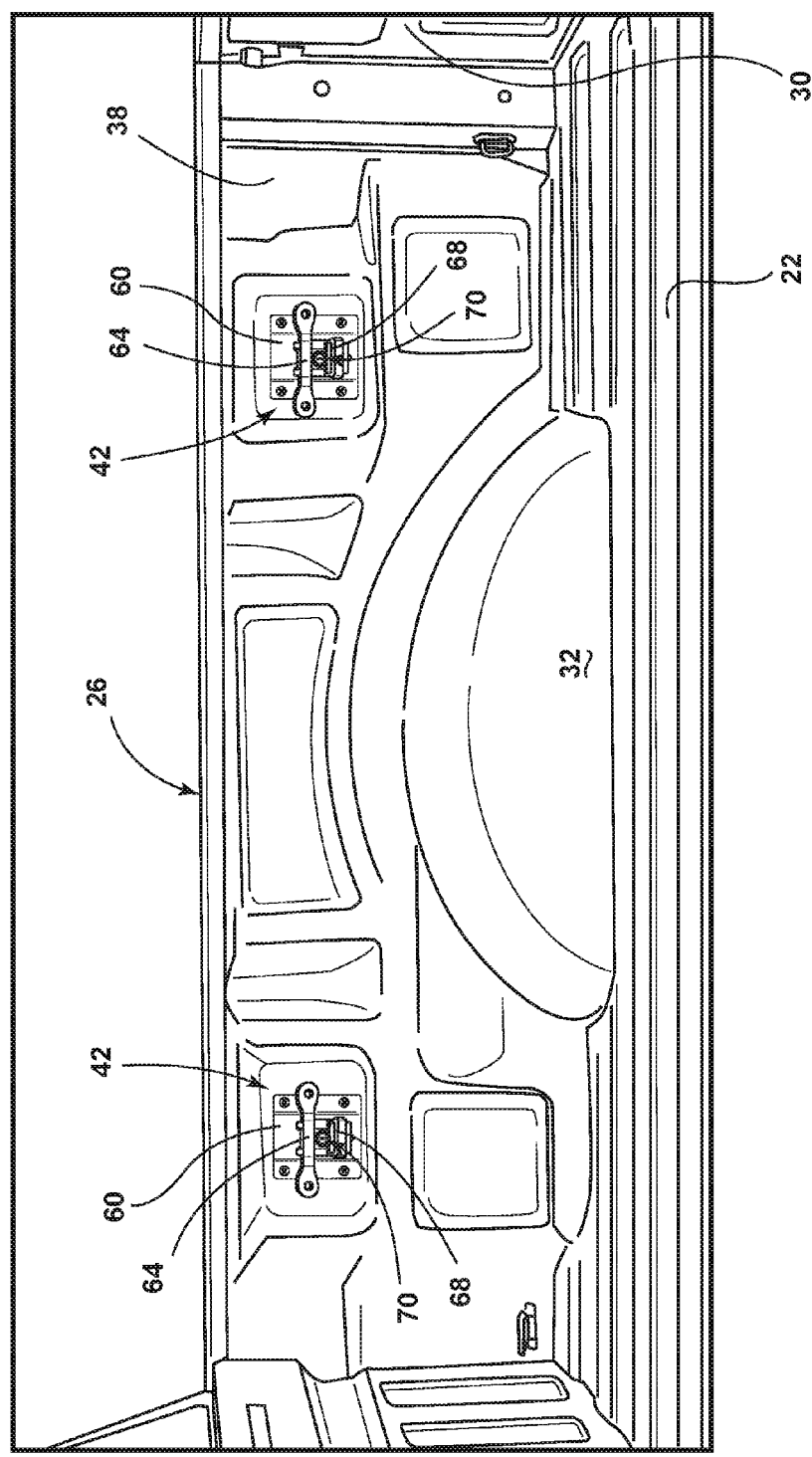
FIG. 2A is a cross-sectional view of the vehicle box taken at line II of FIG. 1.
Figure 2B:
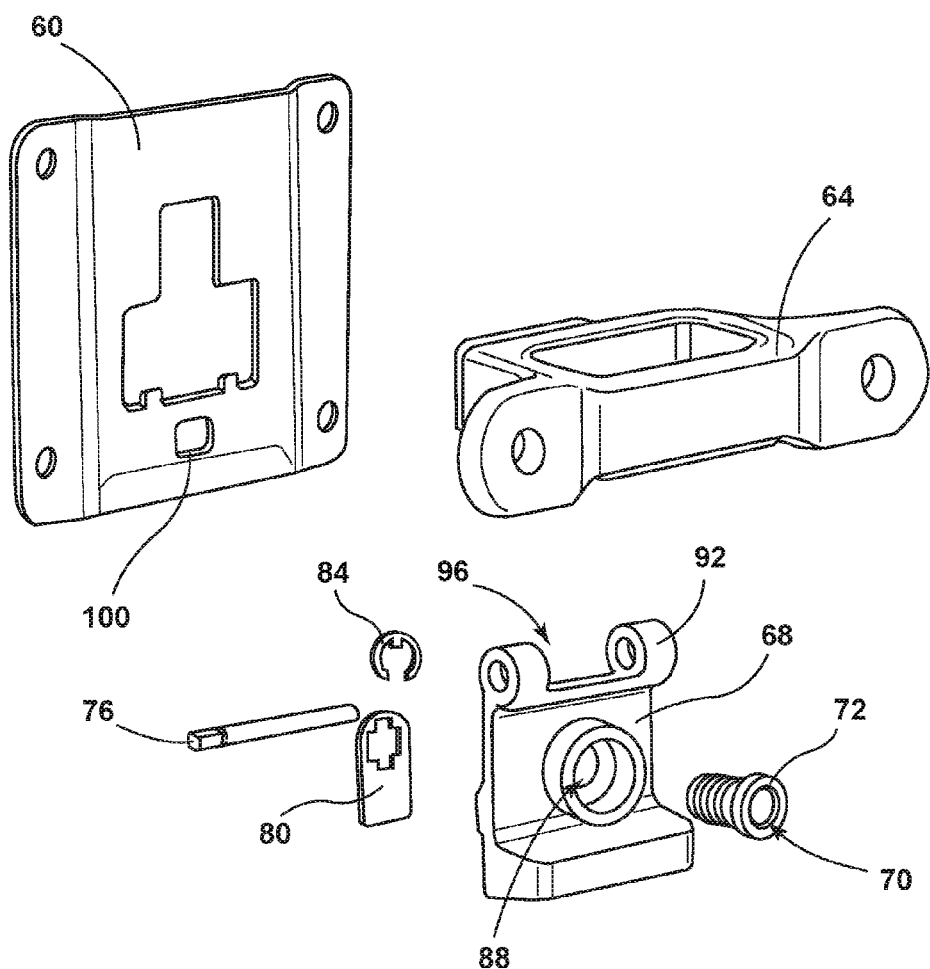
FIG. 2B is an exploded front plan view of the tie-down cleat of FIG. 2A, according to one embodiment.

Referring now to FIGS. 2A and 2B, the cleat assemblies 42 may be configured as a removable cleat assembly 42. In such an embodiment, the cleat assemblies 42 may be composed of multiple components including a base 60, a tie-down cleat 64 and a lower latch 68. Each cleat assembly 42 includes a lock assembly 70 having a cylinder 72, a rod 76, a lock latch 80 and a lock bushing 84. The lock assembly 70 is configured to removably couple the tie-down cleat 64 and/or lower latch 68 to the base 60 such that the tie-down cleat 64 and/or lower latch 68 may be removed from the vehicle 10 when not needed or to provide more capacity or space within the storage area 32. The base 60 is mounted to the inner surface 38 of the box wall 26 via one or more fasteners (e.g., screws, bolts, attachment pins and/or securement features) and/or via welding. The base 60 is also configured to couple with the lower latch 68. The lower latch 68 defines a lock aperture 88, one or more retaining holes 92 and a cleat aperture 96. The retaining holes 92 and the cleat aperture 96 are configured to cooperate such that the tie-down cleat 64 may be secured to the base 60 through the lower latch 68. In the depicted embodiment, the tie-down cleat 64 is positioned in the cleat aperture 96 such that the rod 76 may be slid through the retaining holes 92 and the tie-down cleat 64 such that the tie-down cleat 64 is coupled to the lower latch 68. Disposed through the lock aperture 88 of the lower latch 68 is the cylinder 72 of the lock assembly 70. The cylinder 72 extends through the lock aperture 88, through a lock opening 100 of the base 60 and is coupled to the lock latch 80. In an engaged configuration of the cleat assembly 42, the lock latch 80 is positioned on an opposite side of the base 60 from the lower latch 68 such that the cylinder 72 may rotate the lock latch 80 behind the base 60 and lock the lower latch 68 to the base 60. To facilitate rotation of the cylinder 72 and the lock latch 80, a key 104 may be inserted into the cylinder 72 to allow a user to input rotational movement of the lock latch 80. The key 104 may have a cylinder portion 108 configured to enter the cylinder 72 and a hand portion 112 configured to be gripped by the user of the key 104. The handle portion 112 may include one or more indicia 116 (e.g., manufacturer name, symbol, logo, etc.).

The cylinder 72 of the lock assembly 70 may be composed of a polymeric material such as polypropylene, polyamides, styrenics, polyethylene, polyethylene ether, polycarbonate, acrylic, Plexiglass and combinations thereof. In various embodiments, the cylinder 72 may include a transparent or translucent polymeric material. The polymeric material of the cylinder 72 may include one or more impact modifiers (e.g., elastomeric material or other material configured to impart impact resistance to the cylinder 72) and/or materials configured to enhance the ultraviolet stability of the cylinder 72. An example of an impact modified polymer with acceptable ultraviolet stability would be Arkema Plexiglas® DR® grade polymer. In various embodiments, the cylinder 72 may include one or more phosphorescent materials, as described in greater detail below.

The key 104 may be composed of a polymeric material such as nylon, amorphous nylon, polyphthalamide, acetals, acrylics, cellulosics, phenolics, polyesters, polyolefins and/or polyurethanes. Similarly to the cylinder 72, the polymeric material of the key 104 may include one or more impact modifiers (e.g., elastomeric material or other material configured to impart impact resistance to the key 104) and/or materials configured to enhance the ultraviolet stability of the key 104. In various embodiments, the key 104 may include one or more phosphorescent materials, as described in greater detail below.

Referring again to FIGS. 2A and 2B, the cylinder 72 of the lock assembly 70 and the key 104 may be prepared by dispersing one or more persistent phosphorescent materials in a polymer matrix to form a homogenous mixture using a variety of methods. For example, the cylinder 72 and/or the key 104 may be rendered by dispersing the phosphorescent materials into a solid state solution (homogenous mixture in a dry state) that may be incorporated in a polymer matrix formed by extrusion, injection molding, compression molding, calendaring, thermoforming, etc. Additionally or alternatively, a phosphorescent structure may be disposed on an exterior surface of the cylinder 72, the key 104, the base 60, the tie-down cleat 64 and/or the lower latch 68 which may incorporate the phosphorescent materials and be applied by painting, screen printing, flexography, spraying, slot coating, dip coating, roller coating, bar coating, and/or any other methods known in the art.

The persistent phosphorescent materials may be defined as being able to store an activation emission and release light gradually (i.e., a perceptible glow), for a period of several minutes or hours, once the activation emission is no longer present. The decay time may be defined as the time between the end of excitation from the activation emission and the moment when the light intensity of the phosphorescent structure drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The persistent phosphorescent material, according to one embodiment, may be operable to emit light at or above an intensity of 0.32 mcd/m$^2$ after a period of 10 minutes. Additionally, the persistent phosphorescent material may be operable to emit light above or at an intensity of 0.32 mcd/m$^2$ after a period greater than 30 minutes, greater than 60 minutes, greater than 2 hours, greater than 5 hours, greater than 10 hours or greater than 24 hours. Accordingly, the persistent phosphorescent material may continually illuminate in response to excitation through a plurality of excitation sources emitting an activation emission, including, but not limited to, ambient light (e.g., the sun), light from the light assembly 34 (e.g., CHMSL 34A and/or bed lights 34B), light sources located within the pickup box 18 and/or any other light source disposed onboard or exterior to the vehicle 10. The periodic absorption of the activation emission from the excitation sources may provide for a substantially sustained charge of the persistent phosphorescent materials to provide for a consistent passive illumination. For example, the lighting assembly 34 (e.g., the CHMSL 34A and/or bed lights 34B) may be pulsed, or otherwise periodically be activated to charge the phosphorescent materials such that the cylinder 72 and/or key 104 provides a constant or changing level of emitted phosphorescent light. In some embodiments, a light sensor may monitor the light illumination intensity of the phosphorescent material and initiate an excitation source (e.g., light from the CHMSL 34A and/or bed lights 34B) when the illumination intensity falls below 0.32 mcd/m$^2$, or any other predefined intensity level.

In examples where the CHMSL 34A and/or bed lights 34B are configured to charge the phosphorescent materials, the CHMSL 34A and/or the bed lights 34B may incorporate one or more blue, ultraviolet or high blue content (e.g., greater than about 10%, 20%, 30%, 40%, 50%, 60%, 70%, 80% or 90% of the emitted light is blue) light sources (e.g., light bulb and/or light emitting diode). In examples where the CHMSL 34A is colored, an optically transparent portion may be formed on the CHMSL 34A such that blue light may reach the phosphorescent materials and not be filtered out. The light assembly 34 may include optics configured to preferentially direct light (e.g., from at least one of the CHMSL 34A and bed lights 34B) toward the pick-up box 18, and specifically toward the cleat assemblies 42.

The persistent phosphorescent materials may correspond to alkaline earth aluminates and silicates, for example, doped di-silicates, or any other compound that is capable of emitting light for a period of time once an activation emission is no longer present. The persistent phosphorescent materials may be doped with one or more ions, which may correspond to rare earth elements, for example, $Eu^{2+}$, $Tb^{3+}$ and $Dy^{3+}$. The polymeric material of the cylinder 72 or the key 104 may include between about 0.1% to about 25.0% of the persistent phosphorescent material either by weight or mole fraction. In embodiments utilizing the phosphorescent structure on the cylinder 72, the key 104, the base 60, the tie-down cleat 64 and/or the lower latch 68, the structure may include a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The phosphorescent material, according to one embodiment, may be a translucent white color when unilluminated. Once the phosphorescent material receives the activation emission of a particular wavelength, the phosphorescent material may emit white light, blue light, red light, green light or combinations thereof therefrom. The light emitted from the phosphorescent material, and thereby the key 104, lock assembly 70 or cleat assembly 42 may be of a desired brightness such that the key 104, lock assembly 70 or cleat assembly 42 are visible and locatable. According to one embodiment, the blue emitting phosphorescent material may be $Li_2ZnGeO_4$ and may be prepared by a high temperature solid-state reaction method or through any other practicable method and/or process. The blue afterglow may last for a duration of two to eight hours and may originate from an activation emission and d-d transitions of $Mn^{2+}$ ions. In embodiments where the key 104 includes the indicia 116, the light emitted from the key 104 may be bright enough to facilitate a user (i.e., a human) to find the key 104 in the dark, but not so bright that the indicia 116 is not perceptible. It will be understood that the cylinder 72 may include a first phosphorescent material and the key 104 may include a second phosphorescent material. The first and second phosphorescent materials may be the same material, or may be configured to output different colors, intensities or have different lengths of persistence.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistent phosphor, such as Performance Indicator PI-BG20, and 12.5 parts of a dye solution containing 0.1% Lumogen Yellow F083 in dioxolane may be blended to yield a low rare earth mineral phosphorescent structure or be used in the cylinder 72 and/or key 104. It will be understood that the compositions provided herein are non-limiting examples. Thus, any phosphor known in the art may be utilized for utilization as a phosphorescent material or structure without departing from the teachings provided herein. Moreover, it is contemplated that any long persistent phosphor known in the art may also be utilized without departing from the teachings provided herein.

Additional information regarding the production of long persistence luminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," issued Feb. 10, 2015, all of which are incorporated herein by reference in their entirety.

Additionally or alternatively, the key 104, lock assembly 70 or cleat assembly 42 may be mixed with or include a structure including one or more photoluminescent materials. Such photoluminescent materials may have energy converting elements with phosphorescent or fluorescent properties. For example, the photoluminescent material may include organic or inorganic fluorescent dyes including rylenes, xanthenes, porphyrins, and phthalocyanines, or combinations thereof. Additionally or alternatively, the photoluminescent material may include phosphors from the group of Ce-doped garnets such as YAG:Ce. The photoluminescent material may be formulated to have a Stokes shift resulting in the conversion of visible or non-visible light into visible light having an emission spectrum expressed in a desired color, which may vary per lighting application. Such photoluminescent material may have a limited persistence (e.g., less than about 10 minutes, less than about 5 minutes, less than about 1 minute or no human perceivable persistence).

Use of the disclosed cleat assembly 42 and/or the key 104 may offer several advantages. For example, including the phosphorescent material in the lock assembly 70 and the key 104 may allow for easy location of the lock assembly 70 and key 104 within the pickup box 18 even in low lighting conditions. Additionally, by including the persistent phosphor material, which may be low cost, expensive and complicated (e.g., due to electrical connections and light bulbs) light assemblies configured to solely illuminate the cleat assembly 42 may be eliminated. Further, by utilizing a passive illumination system, drain on a battery of the vehicle 10 may be prevented. Even further, typically light emitted from phosphorescent materials is most intense immediately after removal of the excitation source (e.g., dusk or a storm arriving). Accordingly, the phosphorescent materials may be at maximum light production when a user is most likely to use the cleat assembly 42. It will be understood that the cleat assembly 42 may be utilized elsewhere in the vehicle 10 (e.g., in the cab 14, under the vehicle 10) or in other settings (e.g., on a building, on a boat or ship, on a work bench).

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims, by their language, expressly state otherwise.

What is claimed is:

1. A vehicle comprising:
   a pickup box defining a storage area therein;
   at least one cleat assembly extending into the storage area, the cleat assembly comprising:
   a base;
   a tie-down cleat coupled to the base;
   a lock assembly, the lock assembly configured to removably couple the tie-down cleat to the base, wherein the lock assembly includes a translucent polymer and a first phosphor material; and
   a key configured to operate the lock assembly, the key comprising a polymeric material mixed with a second phosphor material.

2. The vehicle of claim 1, wherein at least one of the first and second phosphor materials are configured to have a perceptible glow for greater than 10 hours after charging.

3. The vehicle of claim 1, further comprising:
a light disposed proximate the pickup box configured to charge a least one of the first and second phosphor materials.

4. The vehicle of claim 1, wherein the lock assembly includes between about 0.1% and about 25% of the first phosphor material.

5. The vehicle of claim 1, wherein the translucent polymer is impact modified.

6. The vehicle of claim 1, wherein an indicia is disposed on top of the key and the indicia is configured to be illuminated by the second phosphor material.

7. The vehicle of claim 1, wherein the first and second phosphor materials are configured to emit different colors.

8. A vehicle comprising:
a pickup box defining a storage area therein;
at least one cleat assembly extending into the storage area, the cleat assembly comprising:
a base;
a tie-down cleat coupled to the base;
a lock assembly configured to removably couple the tie-down cleat to the base; and
a key configured to operate the lock assembly, wherein the key and the lock assembly are both configured to illuminate by having a photoluminescent structure.

9. The vehicle of claim 8, wherein the key and the lock assembly each comprise a phosphor material.

10. The vehicle of claim 9, wherein the key and the lock assembly each comprise a different phosphor material.

11. The vehicle of claim 8, wherein at least one of a first and a second phosphor materials are configured to have a perceptible glow for greater than 10 hours after charging.

12. The vehicle of claim 9, further comprising:
a light disposed proximate the pickup box configured to charge the phosphor material.

13. The vehicle of claim 12, wherein the lock assembly includes between about 0.1% and about 25% of the first phosphor material.

14. The vehicle of claim 8, wherein the lock assembly comprises a transparent polymer.

15. A cleat assembly, comprising:
a tie-down cleat; and
a lock assembly configured to removably couple the tie-down cleat to a motor vehicle,
wherein the lock assembly is configured to emit light; and
a light separately disposed away from the lock assembly and configured to charge the lock assembly.

16. The vehicle of claim 15, wherein the lock assembly comprises a phosphor material.

17. The vehicle of claim 16, wherein the phosphor material is disposed within a lock cylinder of the lock assembly.

18. The vehicle of claim 17, wherein the lock cylinder comprises a transparent polymer.

19. The vehicle of claim 15, further comprising:
a key configured to operate the lock assembly, wherein the key is configured to emit light.

20. The vehicle of claim 19, wherein the key comprises between about 0.1% and about 25% of a phosphor material and the cleat assembly is positioned within a vehicle.

* * * * *